(12) United States Patent
May

(10) Patent No.: US 6,722,312 B2
(45) Date of Patent: Apr. 20, 2004

(54) SUPER HYDRATION PRODUCT MIX TRAY

(75) Inventor: Jeffrey Carl May, Lees Summit, MO (US)

(73) Assignee: Dawe's Laboratories, Arlington Heights, IL (US)

( * ) Notice: Subject to any disclaimer, the term of this patent is extended or adjusted under 35 U.S.C. 154(b) by 0 days.

(21) Appl. No.: 10/134,332

(22) Filed: Apr. 29, 2002

(65) Prior Publication Data

US 2003/0200934 A1 Oct. 30, 2003

(51) Int. Cl.[7] .......................... A01K 1/10; A01K 39/00; A01K 5/00
(52) U.S. Cl. .................. 119/61; 119/490; 119/487; 119/401; 119/402; 119/454
(58) Field of Search .................. 119/61, 487, 489, 119/490, 491, 492, 493, 482, 515, 58, 72, 65, 401, 402, 408, 409, 412, 452, 454, 52

(56) References Cited

U.S. PATENT DOCUMENTS

| | | | | |
|---|---|---|---|---|
| 1,829,108 A | * | 10/1931 | Petersen | |
| 2,015,341 A | * | 9/1935 | Gorsuch | |
| 2,026,417 A | * | 12/1935 | Conway et al. | |
| 2,422,438 A | * | 6/1947 | Richards | |
| 2,439,873 A | * | 4/1948 | Snyder | 119/467 |
| 2,599,844 A | * | 6/1952 | Kounkel | |
| 2,675,781 A | * | 4/1954 | Bielefeld | 119/537 |
| 2,892,604 A | * | 6/1959 | Keen et al. | |
| 3,738,329 A | * | 6/1973 | Schweitzer | 119/63 |
| 5,377,447 A | * | 1/1995 | Fritch | 47/33 |
| 5,820,297 A | * | 10/1998 | Middleton | 405/52 |

FOREIGN PATENT DOCUMENTS

| | | | | |
|---|---|---|---|---|
| FR | 2625407 A3 | * | 7/1989 | A01K/7/06 |
| SU | 1099-919 A | * | 6/1982 | |

* cited by examiner

Primary Examiner—Peter M. Poon
Assistant Examiner—Andrea M. Valenti
(74) Attorney, Agent, or Firm—McKee, Voorhees & Sease, P.L.C.

(57) ABSTRACT

An improved poult box for transportation of newly hatched turkey poults. The box has an open top, a bottom joined by opposing sidewalls and at least one box divider. Positioned on the box divider is a removable poult feed tray which rests over the divider and presents feed at approximately eye level of turkey poults.

7 Claims, 5 Drawing Sheets

SUPER HYDRATION PRODUCT MIX TRAY

FIELD OF THE INVENTION

This invention relates to an improved poult box, and to a poult feed tray which may be used in combination or independently of the box.

BACKGROUND OF THE INVENTION

Turkey poults are often transported when less than a day old from the poult hatchery to turkey farms. After hatching, turkey poults are about the same size as chickens but they present an unusual feeding problem compared to chickens that are fed at the hatchery. Chickens instinctively look down to the ground at their feet and therefore eat feed located on the ground. Turkey poults do not do this. Instinctively they look up for feed. This presents a problem in feeding turkey poults in transportation boxes, since they will not find feed at the bottom of transport boxes.

In the past there have been several methods used in an attempt to get turkey poults to eat during transportation from the hatchery to the farm. Getting them to do so is, of course, desirable because it phases the turkeys from a survival mode to growth mode more quickly. Quicker transfer from survival to growth means better performance and in some cases, even a better chance for survival.

To achieve the advantages of a quicker switch from survival curve to growth curve, hatcheries have placed compressed poult feed, similar in size to a hockey puck in the box or crate, and adhered it to the wall of the box at about eye level. The hope is that the poults would see the compressed feed gel and eat from it. This has had limited success for several reasons. First, the compressed feed often breaks. Second, the feed often becomes disengaged from the wall falling to the floor where it is ignored by the poults; and third, compressed feed is sticky and may cause the poults to stick together. One other prior method used in the past is simply to attach paper trays to the walls of the transport box. This too has had limited success because the paper trays are flimsy and the moment the poults peck at the tray it becomes deformed and disfigured, spilling its content onto the floor where the poults ignore it. Also, the design of the paper tray hid the product from view of the birds. And, seeing the product is an essential part of the success of feeding the poults.

This invention has as its primary objective the presentation of an improved poult box incorporating a removable feed tray which fits over dividers of the poult box to present feed at approximately eye level for turkey poults. The tray is made of a single sheet of unitary material, such as metal, and thus provides rigidity and structure which can withstand the pecking of the turkey poults. Moreover, the tray can be removed from one box and used on another, as needed.

BRIEF SUMMARY OF THE INVENTION

An improved poult box for transportation of newly hatched turkey poults for the purpose of hydration of the poults prior to shipment of poults from the hatchery to the farm. The box has an open top, a bottom joined by opposing sidewalls and at least one box divider. Positioned on the box divider is a removable poult feed tray which rests over the divider and presents feed at approximately eye level of turkey poults.

DETAILED DESCRIPTION OF A PREFERRED EMBODIMENT

Figure 1:
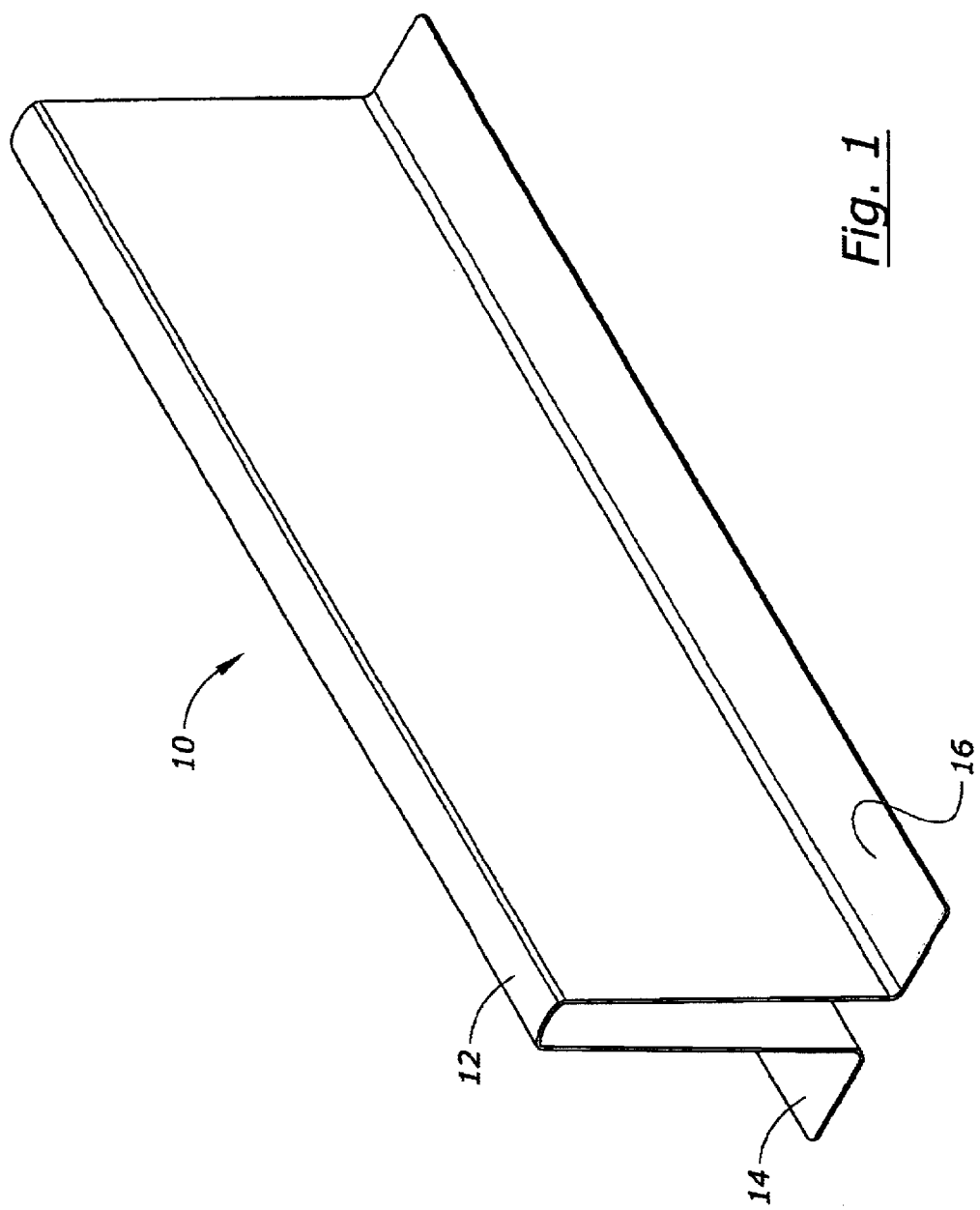
FIG. 1 is a perspective view of the poult feed tray.
Figure 2:
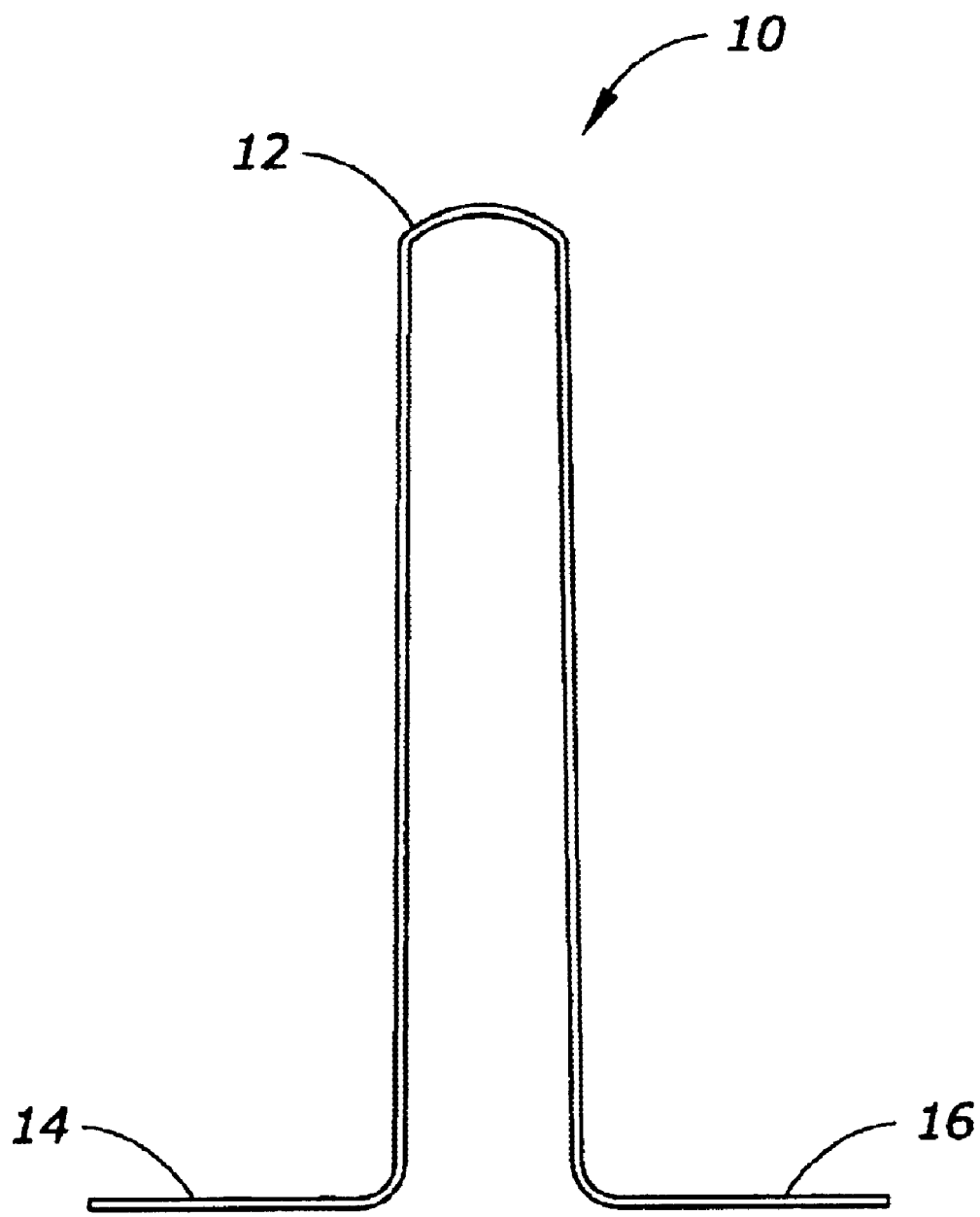
FIG. 2 is an end view of the poult feed tray shown in FIG. 1—1.
Figure 3:
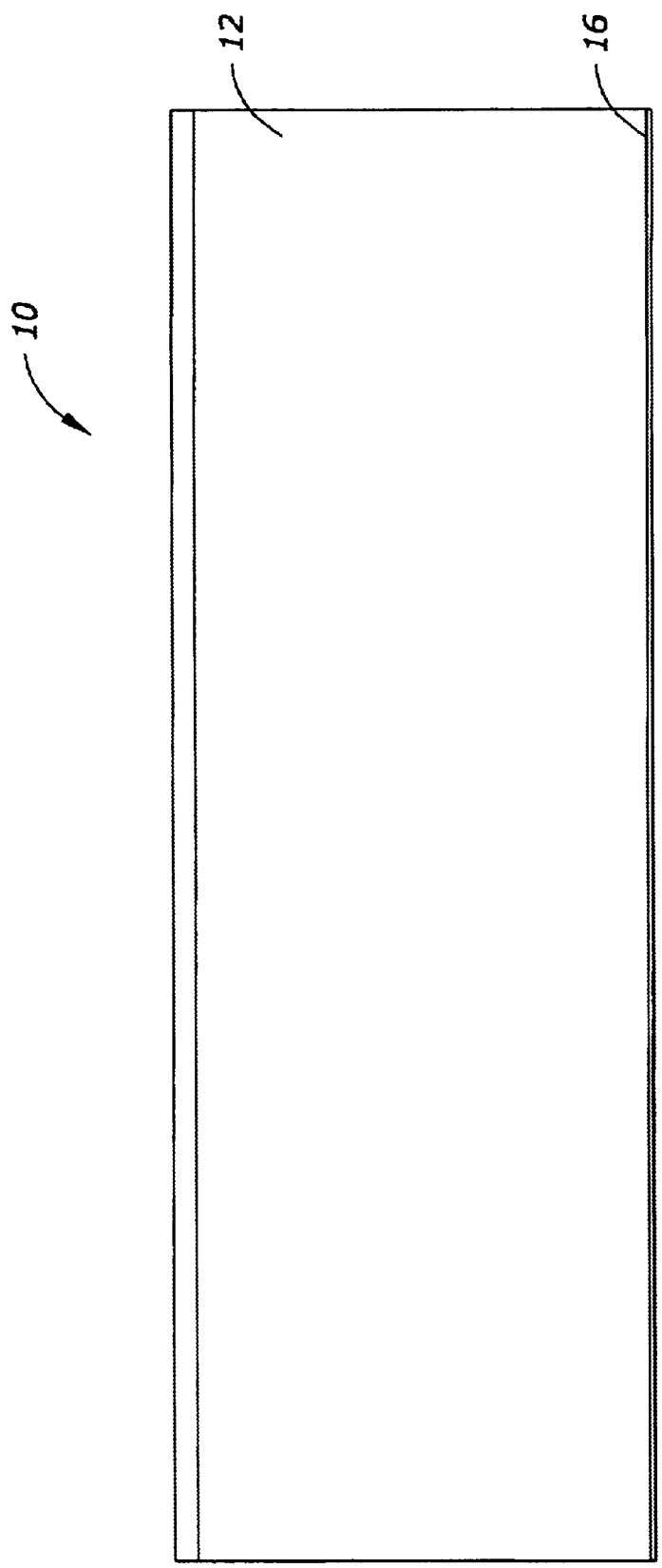
FIG. 3 is a side view of the poult feed tray of FIG. 1.

FIG. 1 shows the tray 10 which can be formed from a single sheet of material such as stainless steel, tin, etc. Stainless steel is preferred for its durability. The poult feed tray 10 has an inverted U-shaped and cross-section portion 12 which terminates into horizontally disposed tray portions 14 and 16. This tray 10 is designed so that it may fit over a box divider (see FIG. 4).

Figure 4:
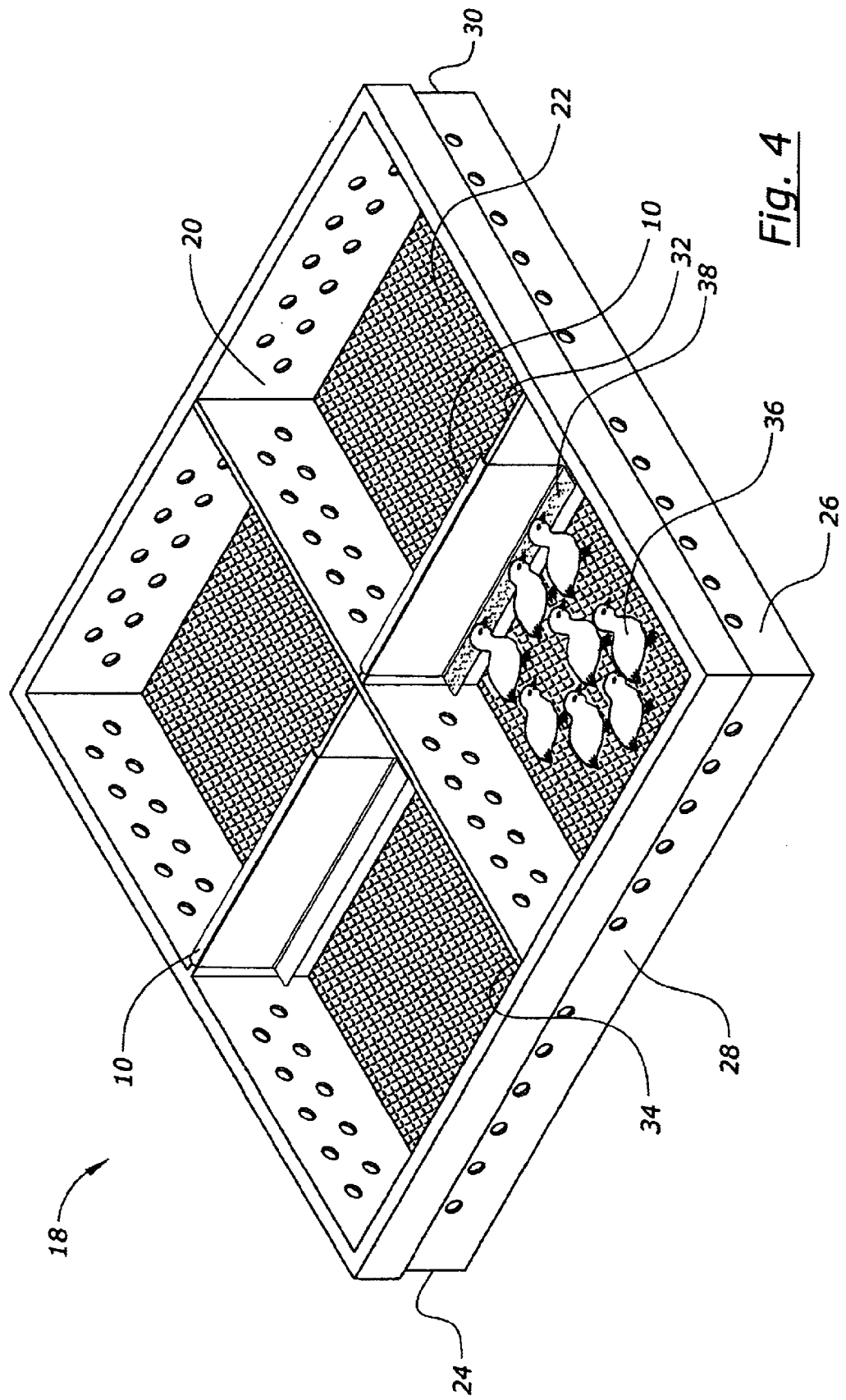
FIG. 4 is a perspective view of a poult box with two dividers and showing two trays.

As illustrated, FIG. 4 shows a poult box 18, an open top 20 and a bottom 22. The box 18 has opposing sidewalls 24, 26, 28 and 30. Dividing box 18 into quarter sections are dividers 32 and 34. As illustrated in FIG. 4, at least one tray 10 can be placed over divider 34. In FIG. 4, two trays 10 are illustrated as being placed over divider 34 in such a manner that at least one horizontally disposed tray portion or shelf 14 or 16 is exposed to each quarter section of box 18.

Figure 5:
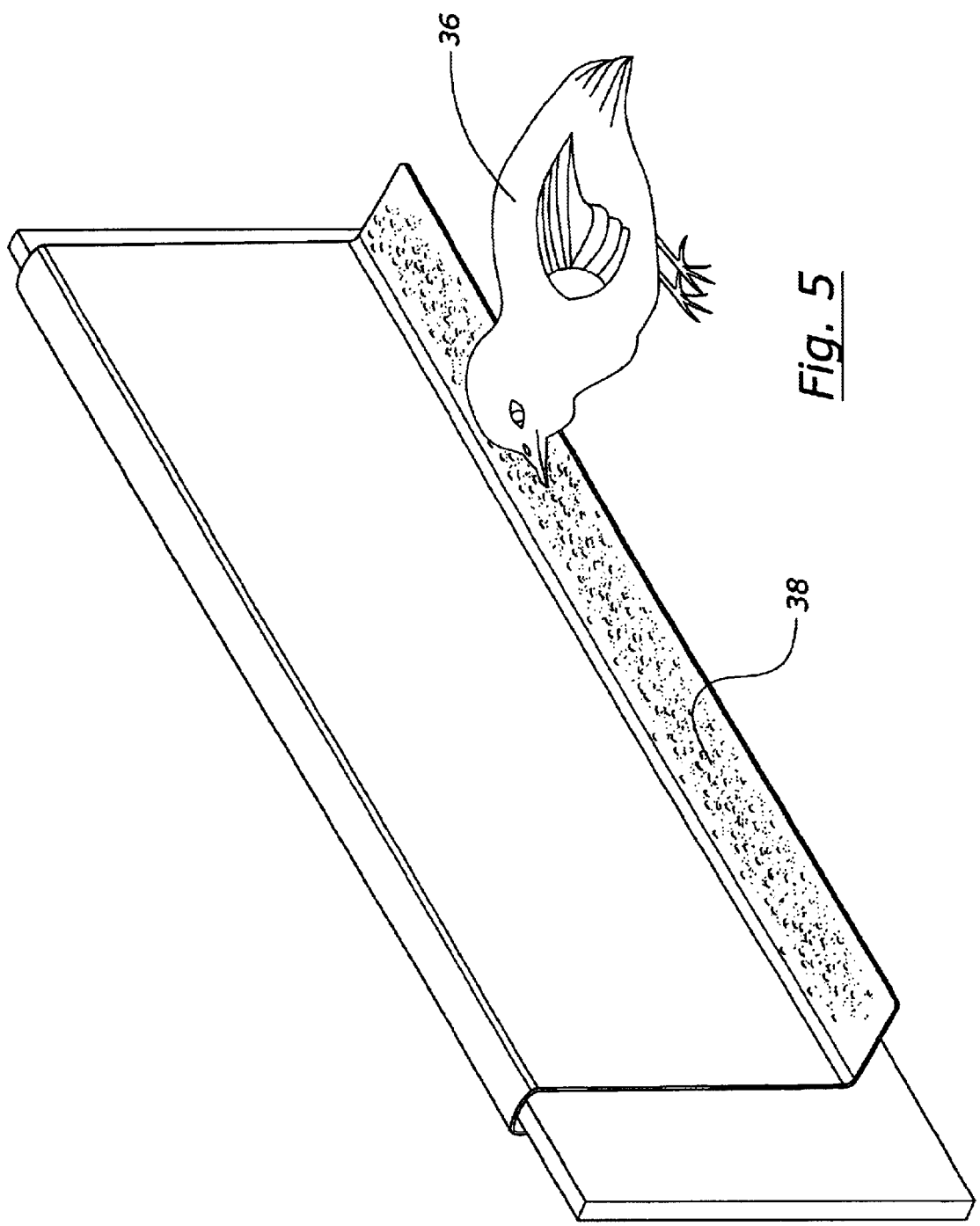
FIG. 5 shows the tray in perspective and shows how poults can feed from it.

A starter super hydration gel mix, for example the type sold by Dawe's Laboratories as a super hydrating poultry gel, plus nutrition, under the trademark GRO GEL PLUS can then be placed on the horizontally disposed trays 14 and 16. Such poult starter nutrition mix is known and need not be described herein. Generally it comprises a super hydration polymer mix with some nutritional materials such that it will stay on trays 14 and 16 when placed there. As illustrated in FIG. 5, the poults 36 see the feed 38 on the trays 14 and 16 which are approximately eye level for the poults. The poults can conveniently eat from the trays 14 and 16 during transport.

The poult box 18 with trays 10 full with feed 38 are often placed on the table under 1500 watt lights for thirty minutes to insure that the feed gel product 38 is consumed. As a result, the poults are off to a quicker start and withstand the transportation stresses.

From the above description, it can be seen that the invention accomplishes at least all of its stated objectives.

What is claimed is:

1. An improved poult box, comprising in combination:
   an open top box having a bottom, joined by opposing side walls and at least one box divider;
   at least one poult feed tray formed from a single sheet of material, comprising a central divider portion, inverted U-shaped in cross section, terminating in two horizontal disposed sheet portions each adapted to be a food carrying ledge;
   the poult feed tray removably fitting over the top edge of the divider to present feed resting upon the food carrying ledge at approximately eye level of turkey poults.

2. The improved poult box of claim 1 wherein the poult feed tray is pressed from a single sheet of stainless steel.

3. The improved poult box of claim 2 wherein the box is made of polymeric plastic material.

4. The improved poult box of claim 3 wherein the box has ventilation holes for air circulation.

5. The improved poult box of claim 1 which has two box dividers, dividing the box into quarters, and two removable poult trays.

6. A poult feed tray press formed from a single sheet of material, comprising:

the single sheet of material formed into a central divider portion, inverted U-shaped in cross section for fitting over the top edge of a box divider, terminating in two horizontal disposed tray portions without an upturned edge; and the horizontal disposed tray portions adapted for affixing poult starter feed at approximately eye level of turkey poults.

7. The tray of claim 6 wherein the single sheet of material is stainless steel.

* * * * *